Patented June 24, 1930

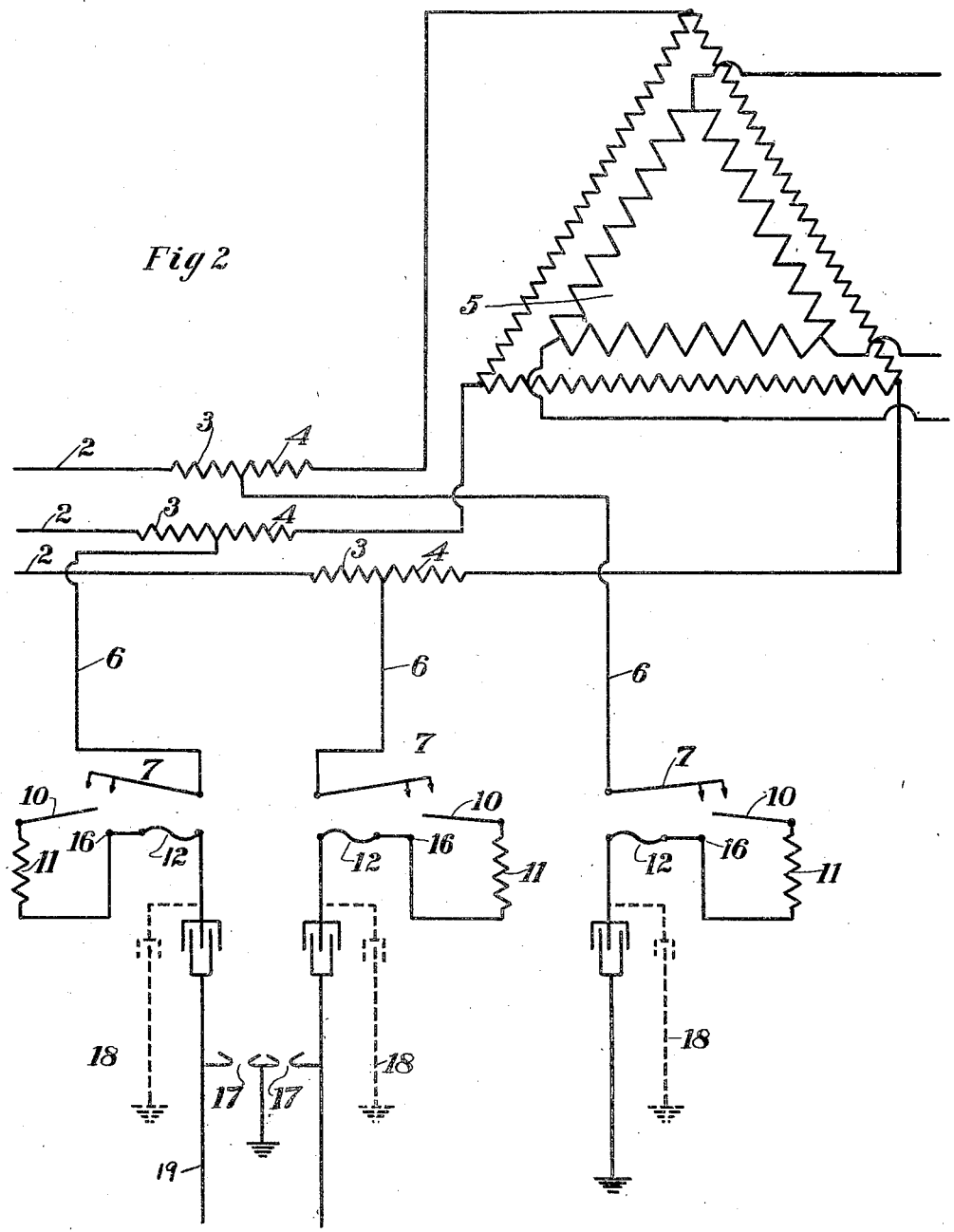

1,766,738

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

PROTECTIVE APPARATUS AND CIRCUITS

Application filed June 25, 1924. Serial No. 722,206.

This invention relates to apparatus and circuits for protection against lightning and other high frequency and high potential disturbances in which a condenser forms a part of the apparatus. The invention has for its object the provision of protection both for the station apparatus and the condenser.

The invention is exemplified in the combination and arrangement of parts shown in the accompanying drawings and described in the following specification and it is more particularly pointed out in the appending claims.

In the drawings—

Fig. 2 is a circuit diagram showing one arrangement for the present invention.

Figure 1:
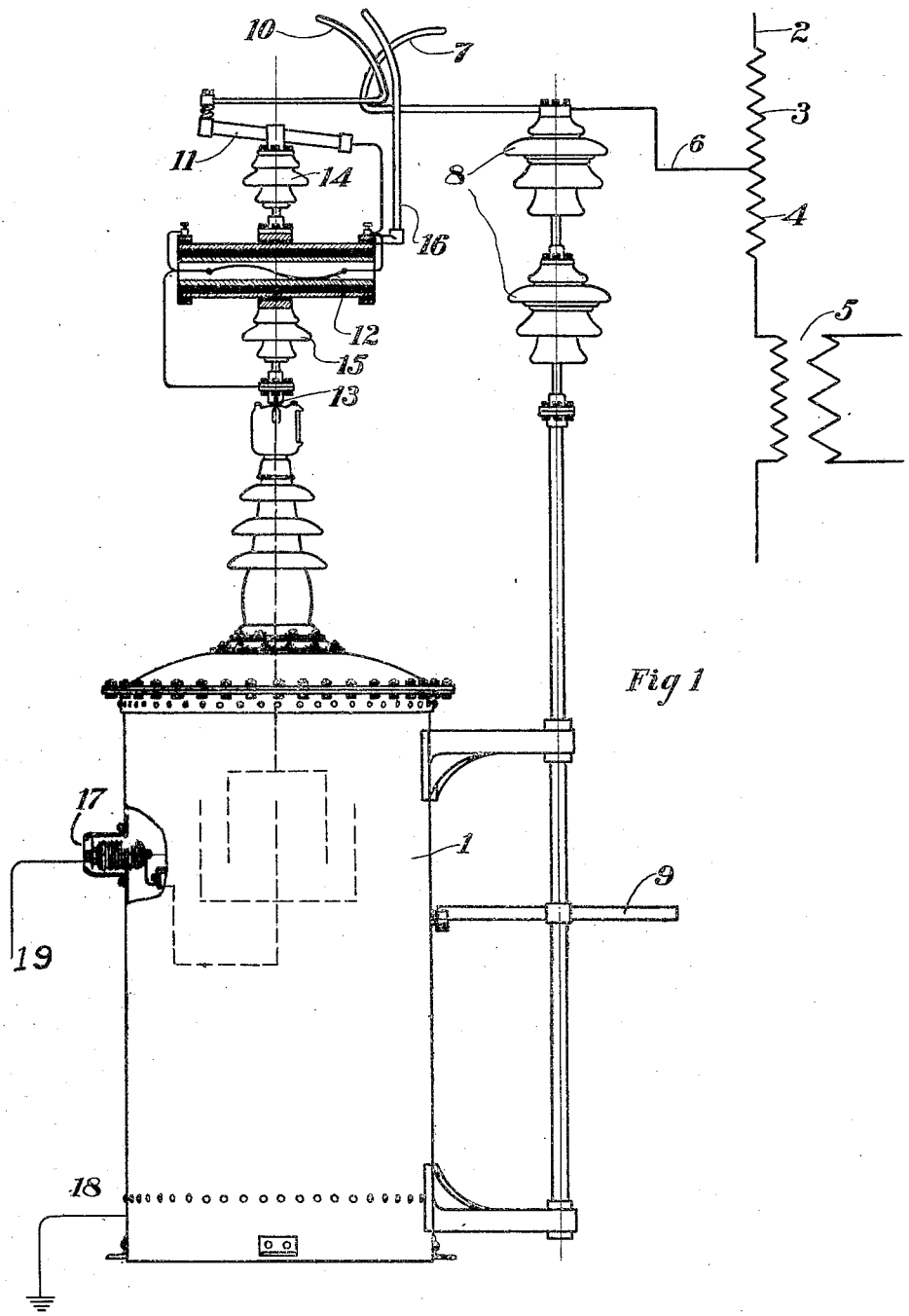
Fig. 1 is a somewhat diagrammatical view showing a condenser housing in elevation as connected with a power line circuit and embodying one form of the present invention.

The flow of current into a condenser varies approximately as the frequency and the applied voltage. The severe electrical disturbances which cause damage to apparatus connected with transmission lines are usually at high frequencies. Lightning, which is usually most severe as regards magnitude of voltage, is at very high frequency or at least produces surge with steep wave front.

Since the current flowing into an electrostatic condenser varies approximately directly as its electrostatic capacity and directly as the voltage, a high impressed voltage and a high frequency will permit a very considerable current to flow in the condenser.

If a condenser of sufficient capacity is attached to a transmission line in the vicinity in which protection is desired, a large part of the high frequency disturbance may flow into the condenser without raising the voltage to a dangerous value. Where the amount of energy in the surge is large, it is possible that the voltage of the condenser may be raised to such a value that it will form but little protection, or the condenser may at least have to be considerably larger in order to keep down the maximum voltage, but with a properly designed condenser adequate protection may be provided in most cases.

In Fig. 1 there is shown a method of installing a condenser which has protection for the condenser itself and which provides protection to the apparatus in the vicinity of the condenser. With this arrangement lightning protection is gained for the equipment in the vicinity of the condenser, and, at the same time the condenser may be used for other purposes such as electrostatic coupling where the transmission line is used for a telephone circuit or for signalling purposes, for communication or for remote control of stations. In this figure the numeral 1 designates a casing containing a condenser of proper design to withstand the voltage to which it will be subjected. The numeral 2 designates a transmission line 3 a resistance between the transmission line and the disconnecting switch leading to the condenser and 4 a resistance connecting to the transformers of the station or other electrical equipment designated generally by 5. Only one line of the transmission circuit is shown in Fig. 1 but it will be understood that each conductor of the circuit will be provided with equipment similar to that shown in the figure. A lead 6, running from the main conductor circuit to the condenser disconnecting switch, serves to couple the condenser to the line. The disconnecting switch has a horn or contact arm 7 which is attached to the switch insulators 8. This horn may be rotated by moving the handle 9, which rotates the disconnecting switch insulators. When the disconnecting switches are being closed, the horn 7 comes into contact with an arm 10. This is connected to one end of a relatively high resistance 11. The other end of the resistance is connected to a fuse 12. The other end of the fuse 12 is connected to the terminal of the bushing 13 leading to one element of the condenser in the housing 1. The fuse 12 serves to disconnect the line in case of a short or ground in the condenser. An insulator 14 supports the high resistance 11 and insulates the resistance from the condenser and the fuse 12. Another insulator 15 insulates the fuse 12 from the condenser bushing terminal. This is desirable to cause the current to take the proper path. In closing the switch, contact is first made between the contacts 7 and 10. If the switch is connected to a line carrying a high voltage, an arc will be established between the horns or contact members 7 and 10 before they come into contact with each other. This tends to set up an oscillation which may cause an electrical disturbance which it is desirable to eliminate. By causing current to flow through the relatively high resistance 11, the magnitude of the disturbance can be greatly reduced or in some cases practically eliminated. As the switch arm 7 continues to rotate, contact is made with the horn 16, which is attached to one end of the protecting fuse 12. The high resistance is then shunted and its effect eliminated from the circuit.

In operation with the switch 7, 10, 16 closed a high frequency disturbance causes current to flow into the condenser in accordance with the laws of the condenser. By the insertion of a sufficiently high resistance 3, a very considerable drop in voltage over the resistance 3 will take place, thereby reducing the magnitude of the surge.

Where the power apparatus has some appreciable electrostatic capacity, a further resistance 4 may be used. The drop in voltage will be proportional to the resistance and to the current flow. Since the flow of current will be very high with the high frequency, there will be a considerable drop in voltage over both the resistance 3 and the resistance 4, even though the voltage may not exceed that of the normal line voltage. This applies only where high frequency is applied. During normal operation, the current flowing over the resistances 3 and 4 will cause loss in power, but since the current flowing on high voltage lines is usually small compared to the current which will flow into the condenser under a high frequency and a high voltage, a resistance may be used which will be quite effective in absorbing voltage and energy at high frequency, but which will cause little loss at the normal operating frequency and current on the system.

The system as shown has very material advantages as small apparatus may be protected with a comparatively small condenser by properly proportioning either or both of the resistances. A station drawing a relatively small amount of power from the system may use higher resistances without producing a serious loss.

Since the voltage drop due to high frequency will be in direct proportion to the resistance and the capacity of the condenser, it would seem that the same result may be obtained by increasing the resistance and lowering the capacity of the condenser, permitting a condenser of lower capacity and less cost to be used.

The resistance in the circuit plays an important function in damping out the disturbance. There is a possibility in some cases that the resulting surge or oscillation set up in the system following lightning or any disturbance will cause more damage than the primary disturbance itself. The flow of current over the resistance will tend to absorb the energy of this disturbance and thereby minimize danger from this source.

Where a coupling condenser is used, it is desirable to arrange the apparatus so that practically the entire electrostatic capacity of the condenser is used for protection purposes. In order to do this, the low voltage side of the condenser is connected to the case or ground through a small gap 17. For the lighter surges a charging current due to surge will pass largely to ground through the ground lead 18 connected to the condenser case. For severe surges, however, the air gap 17 breaks down and couples a much larger capacitance to ground. This gap prevents a serious rise in voltage to the apparatus connected to the condenser and permits a comparatively small amount of insulation on the low voltage side of the condenser as well as making the entire capacitance in the condenser available for lightning protection. The low voltage side of the condenser is provided with a conductor 19 for connecting it with carrier current signalling apparatus.

In operation either resistance 3 or 4 may be eliminated, provided the impedance of the line is sufficient to produce the necessary drop in voltage or the absorption of the high frequency discharge. In general, however, a much larger condenser will be necessary if the resistances are not used. By the use of resistance, it is also possible to use a condenser and apparatus of lower dielectric strength which may effect a material saving in cost. The resistances 3 and 4 may be in the form of concentrated resistances in the form of helices which have a relatively high resistance compared with the conductor or in the form of an inductive lead, providing the space will permit. The resistance wire may be wound inductively or non-inductively or it may be so wound as to create losses in properly disposed conducting members located in the resistance itself. Where high voltages are used and the dimensions of the resistance are comparatively small, it may be necessary to operate the resistance in an oil bath so as to prevent flash-over. The oil bath may also be used to cool the resistance.

For an incoming surge the resistance 3 is effective in reducing the voltage on both the condenser and the other connected apparatus. The station apparatus is still further protected by the resistance 4. The resistance 4 is also valuable in protecting the station apparatus from a bound charge released from the condenser.

The use of resistances 3 and 4 make it possible to provide protection for a single impulse of steep wave front, a resulting or sustained oscillation, or the release of a bound surge. Either one or both of the resistances may be used to obtain the desired results. While the incoming lead or tap may be used for resistance 3 it is usually advisable to use a concentrated resistance for 4, although a suitable lead may be used as in 3.

I claim—

1. The combination with a transmission circuit of apparatus for receiving power from said circuit, a resistance interposed in series with said circuit and apparatus, a condenser connected with said circuit in series with said resistance but in shunt with said power-receiving apparatus and a fuse interposed between said condenser and circuit.

2. The combination with a transmission circuit of apparatus for receiving power from said circuit, resistance interposed between said apparatus and circuit, a condenser having one element thereof connected with said circuit in series with said resistance and in shunt with said apparatus, a connection with the other element of said condenser to superimpose signal impulses on said circuit and an arcing gap to ground from said last named element.

3. The combination with a transmission circuit of power apparatus in series with said circuit, resistance interposed in series with said power apparatus and circuit, a condenser having one element thereof connected in series with a portion only of said resistance, a signalling connection with the other element of said condenser and a fuse interposed between said condenser and resistance.

4. The combination with a transmission circuit of a condenser, an overload cut out, a resistance element and a switch, said switch having means for connecting said condenser to said circuit with said overload cut out and resistance in series therewith, said resistance being short circuited when said switch is completely closed.

5. The combination with a transmission circuit of power apparatus in series with said circuit, a resistance interposed in series with said circuit and power apparatus, a condenser connected with said circuit in series with said resistance, an overload cut out interposed in series with said condenser, a switch for making and breaking the connection with said circuit and a resistance connected in series with said condenser for a period of time during the closing of said switch but cut out of said circuit when said switch is completely closed.

6. The combination with a condenser housing of a bushing insulator therefor, a fuse member supported by said bushing insulator at one end of said insulator and externally thereof and a switch element also supported by said bushing insulator.

7. The combination with a condenser housing of a switch supported by said housing and insulated therefrom, an insulator bushing for said housing, a fuse element supported on said housing and insulated therefrom, a resistance element on said housing and insulated therefrom and means connected with said switch for short-circuiting said resistance element when said switch is closed.

8. The combination with a transmission circuit of power apparatus connected with said circuit, a resistance in series with said circuit and power apparatus, a condenser having an element thereof connected with said circuit in series with said resistance and in shunt with said power apparatus, the other element of said condenser being provided with a spark gap to ground.

9. The combination with a transmission circuit of power apparatus connected with said circuit, a condenser having one element thereof connected with said circuit, a case for said condenser and a ground connection for said case, the other element of said condenser having a spark gap opening to said case.

10. The combination with a transmission circuit of power apparatus in series with said circuit, resistance interposed in series between said power apparatus and circuit, a condenser having one element connected in series with a portion only of said resistance, there being interposed a fuse and disconnecting switch between said condenser and circuit, a resistance element, means operated by said switch for interposing said resistance element in series with said condenser while said switch is being closed, means for connecting apparatus to the other element of said condenser, said means being provided with a spark gap to ground.

11. The combination with a transmission line and apparatus for receiving power from said line, of a condenser connected to said line at a point between said line and apparatus, resistance in series with said condenser and line, a signal circuit conductor connected with the opposite element of said condenser from that connected to said line, there being a spark gap to ground from said signal circuit, and a grounded capacitance member disposed adjacent said condenser.

12. The combination with a power transmission line and apparatus for receiving power therefrom, of a branch circuit connected to said line adjacent the connection to said apparatus, resistance between said line and the point of connection with said branch circuit, a condenser having one element thereof connected to said branch circuit, a signal circuit conductor connected to the other elements of said condenser, and a casing for said condenser serving as an additional capacitance member in co-operation with the first-named element of said condenser, said casing being grounded.

13. In combination, a transmission line, station apparatus connected with said line, a resistance interposed between said apparatus and line, a grounded metallic condenser housing having condenser elements therein, a carrier current conductor insulated from said housing and connected with one element of said condenser, a spark gap between said housing and carrier current circuit, a bushing insulator extending from said housing, a conductor connected with the other element of said condenser and extending through said bushing insulator, a fuse supported by said bushing insulator, one end of said fuse being connected with said conductor, a switch pole mounted on said bushing insulator and connected with the other end of said fuse, a switch arm arranged to connect said switch pole to said transmission line at a point between said line and station apparatus, a spring-held contact member mounted on said bushing insulator and arranged to engage said switch arm prior to engagement of said arm with said switch pole when said switch arm is moved to closed position, and a resistance element connected between said spring-held contact member and fuse, said resistance element being short circuited when said switch arm engages said switch pole.

14. In combination, a grounded metallic housing, condenser elements disposed within said housing, a carrier current conductor connected with one of said elements and insulated from said housing, a spark gap between said housing and carrier current circuit, a bushing insulator projecting from said housing, a conductor connected with the other element of said condenser and extending through said bushing insulator, a terminal member for said conductor carried by said bushing insulator, an insulator mounted on said terminal member, a tubular housing carried by said insulator, a fuse disposed within said housing and having one end thereof connected with said terminal member, a switch pole mounted on said tubular housing and connected with the other end of said fuse, a second insulator mounted on said tubular housing, a resistance element carried by said second insulator and having one end thereof connected with said switch pole, a spring-held contact member connected with the other end of said resistance element, a movable switch arm arranged when closed to engage first with said spring-held contact member and thereafter with said switch pole, said resistance element being short circuited when said switch arm engages said switch pole, a rotatably mounted upright post, an insulator carried by said post for supporting said switch arm, a transmission line, resistance in series with said transmission line, and station apparatus connected through said resistance with said transmission line, said switch arm being connected with said transmission line between said line and station apparatus.

15. The combination with a transmission circuit, of apparatus for receiving power from said circuit, a resistance interposed in series with said circuit and apparatus, a branch line having one end thereof connected with said circuit between said resistance and apparatus, a condenser electrically connected in said branch line and a fuse interposed between said condenser and circuit.

16. The combination with a transmission circuit, of apparatus for receiving power from said circuit, a resistance interposed between said apparatus and circuit, a branch line having one end thereof connected with said circuit between said resistance and said apparatus, a condenser having one element thereof connected with said branch line, a signalling connection with the other element of said condenser to superimpose signal impulses on said circuit, and an arcing gap to ground from said last named element.

17. The combination with a transmission circuit, of power apparatus connected with said circuit, a resistance in series with said circuit and power apparatus, a branch line connected to said circuit between said resistance and power apparatus, and a condenser having one element connected to said circuit by said branch line, the other element of said condenser being provided with a spark gap to ground.

In testimony whereof I have signed my name to this specification on this 21st day of June A. D. 1924.

ARTHUR O. AUSTIN.